United States Patent
Ogino

[11] Patent Number: 6,100,927
[45] Date of Patent: Aug. 8, 2000

[54] PHOTOGRAPHING APPARATUS HAVING A BLURRING CORRECTING APPARATUS

[75] Inventor: Shigeru Ogino, Tokyo, Japan

[73] Assignee: Canon Kabushiki Kaisha, Tokyo, Japan

[21] Appl. No.: 08/938,914

[22] Filed: Sep. 26, 1997

Related U.S. Application Data

[63] Continuation of application No. 08/441,334, May 15, 1995, abandoned, which is a continuation of application No. 07/875,976, Apr. 28, 1992, abandoned.

[30] Foreign Application Priority Data

May 1, 1991 [JP] Japan ................................. 3-099963
May 1, 1991 [JP] Japan ................................. 3-099964

[51] Int. Cl.$^7$ .................................................. H04N 5/228
[52] U.S. Cl. ........................................ 348/208; 348/169
[58] Field of Search .................................... 348/207, 208, 348/143, 155, 169, 170; 396/55; H04N 5/228

[56] References Cited

U.S. PATENT DOCUMENTS

| | | |
|---|---|---|
| 4,717,958 | 1/1988 | Gal et al. ................................. 358/222 |
| 5,031,049 | 7/1991 | Toyama et al. . |
| 5,109,249 | 4/1992 | Kitajima ................................. 358/222 |
| 5,128,768 | 7/1992 | Suda et al. . |
| 5,155,520 | 10/1992 | Nagasaki et al. ..................... 358/222 |
| 5,170,255 | 12/1992 | Yahara et al. .......................... 358/222 |
| 5,175,580 | 12/1992 | Shiomi ..................................... 396/96 |
| 5,192,964 | 3/1993 | Shinobara et al. ...................... 348/208 |
| 5,272,538 | 12/1993 | Homma et al. . |
| 5,506,912 | 4/1996 | Nagasaki et al. ....................... 382/103 |

*Primary Examiner*—Tuan Ho
*Attorney, Agent, or Firm*—Robin, Blecker & Daley

[57] ABSTRACT

There is provided a photographing apparatus, in which image information in a range wider than an ordinary range is converted into an electric signal by an image pickup and stored into an image memory, a blurring is corrected by moving a reading-out area from the image memory in accordance with the blurring, and when the blurring correction is not performed, the image stored in the image memory is reduced to a predetermined size at a reduction ratio according to a zoom ratio by a zoom switch and is generated.

28 Claims, 9 Drawing Sheets

(A)  (B)

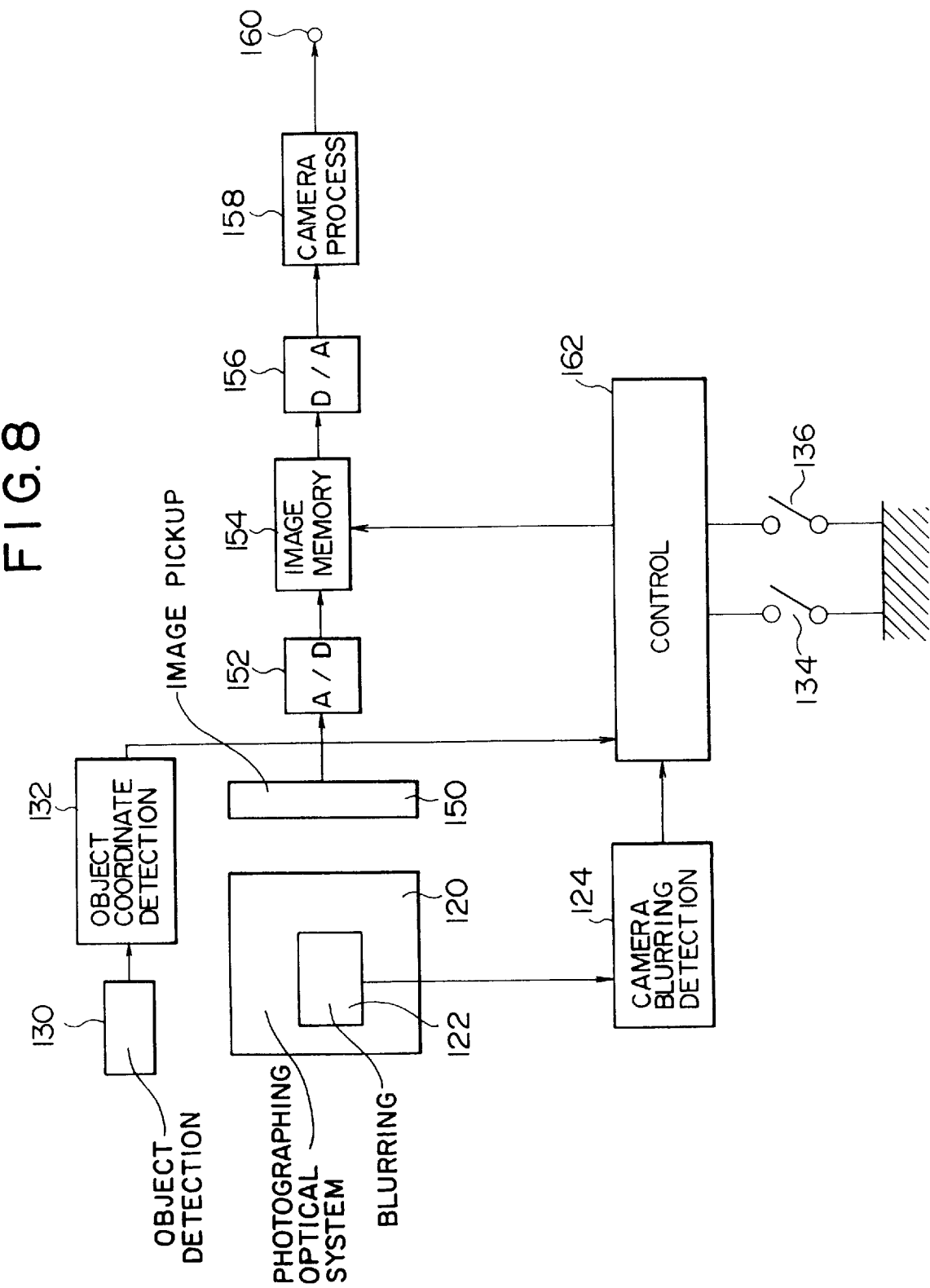

PHOTOGRAPHING APPARATUS HAVING A BLURRING CORRECTING APPARATUS

This is a continuation application under 37 CFR 1.62 of prior application Ser. No. 08/441,334, filed May 15, 1995, now abandoned which is a continuation of Ser. No. 07/875,976, filed Apr. 28, 1992, abandoned.

BACKGROUND OF THE INVENTION

1. Field of the Invention

The invention relates to a photographing apparatus such as a video camera or the like.

2. Related Background Art

In video cameras, a small size and a light weight are realized by putting a solid state image pickup device into a practical use and a number of video cameras are rapidly spread by the realization of a high magnification and multi-functions. In recent years, the exposure control and focusing control are automated and the number of failures of the photographing operations due to those controls is small. However, the video camera is ordinarily used at a hand-gripping position. There is a large possibility of the hand-blurring in association with the realization of the light weight and small size. In almost all of the hand-gripping cases, the photographed picture planes are certainly blurred. A deterioration in picture quality due to such a blurring of the picture plane and an unpleasant feeling such as a video sickness or the like causes a problem.

As disclosed in U.S. Pat. Nos. 2,959,088 and 2,829,557, as means for suppressing or eliminating such a picture plane blurring, there are known constructions such that a correction optical system of the self-supporting driving type by an inertia force is arranged and the image blurring is corrected by the inertia operation for the camera blurring and using an optical decentering apparatus such as a variable apex angle prism or the like which can be freely driven from the outside. In the above constructions, fundamentally, the optical axis of the photographing optical system is decentered in such a direction as to eliminate the blurring of the photographing apparatus main body. The variable apex angle prism has a construction such that the peripheries of two transparent plates which are away from each other in the optical axis direction are closed by bellows and the inside of them is filled with a liquid of a predetermined refractive index. The photographing optical axis is decentered by inclining the transparent plate locating on the object side for the plane which crosses perpendicularly to the center axial line (optical axis at the neutral position).

As a construction to correct the blurring by image signal processes, there has been proposed and put into practical use a blurring correcting apparatus or a vibration isolating apparatus in which an image pickup device having an image pickup area wider than an ordinary display area is used and an image area for a video output in an output of the image pickup device is selected from the output of the image pickup device in accordance with the camera blurring detected by image signal processes.

However, the former blurring correcting apparatus has a problem such that a special optical system for blurring correction and its driving system are needed and the construction becomes complicated. In the case where the blurring correction is not executed, an apparatus using optical axis decentering means such as a variable apex angle prism or the like merely causes a loss of light amount.

On the other hand, the latter apparatus for correcting the blurring by the image signal processes uses the image pickup device having horizontal and vertical pixels of the number exceeding the ordinary number of horizontal and vertical pixels. Upon blurring correction, the image output area is moved horizontally and vertically in the image pickup area in accordance with the camera blurring amount and direction, thereby suppressing or eliminating the camera blurring. When the blurring correction is not performed, the image output area is ordinarily located at the center of the image pickup area and the image information in the areas out of the image output area is not used at all.

In the latter blurring correction apparatus by the image signal processes, the image pickup device having the horizontal and vertical pixels of the number exceeding the ordinary number of horizontal and vertical pixels is used or, in the case of the image pickup device having the ordinary number of horizontal and vertical pixels, an image signal process to magnify an output of the image pickup device is needed. In any of the above two cases, the image information which is not ordinarily used is held for the blurring correction and the image information of the areas out of the range which is necessary for the blurring correction is abandoned. A circuit larger than the ordinary circuit must be prepared as an image processing circuit to process a larger amount of image information. In other words, excessive image information and excessive image signal processing circuit exist and are used only when the blurring is corrected.

The same applicant as the present invention has already filed the following inventions with respect to the blurring correction: U.S. Pat. No. 5,012,270; U.S. patent application Ser. Nos. 403,455 (filed on Sep. 6, 1989), 708,199 (filed on May 31, 1991), and 422,025 (filed on Oct. 16, 1989); U.S. Pat. No. 5,031,049; U.S. patent application Ser. No. 240,915 (filed on Sep. 6, 1988); and the like.

SUMMARY OF THE INVENTION

The present invention is made to solve the foregoing problems and it is the first object of the invention to provide a photographing apparatus which can effectively use image information that is not used in the fetched image information.

The second object of the invention is to provide a photographing apparatus in which in the case where the blurring correction is not performed, information which is used for the blurring correction is effectively used, thereby improving a picture quality.

To accomplish the above objects, according to a preferred embodiment of the invention, there is provided a photographing apparatus comprising image pickup means for converting image information into an electric signal; an image memory to store the image information derived by the image pickup means; image reducing means for reducing the image information read out from the image memory at a predetermined reduction ratio; output processing means for generating an output of the image reducing means as a video signal of a pre-determined format; blurring detection means for detecting a blurring of the apparatus; and control means for moving a reading-out range from the image memory in accordance with the blurring which is detected by the blurring detecting means and for setting the reduction ratio of the image reducing means to one time in the blurring correcting operation and for setting the reduction ratio of the image reducing means to a predetermined designation value other than 1 and for reducing the image which is stored into the image memory to a predetermined size and generating in the case where the blurring correcting operation is not executed.

It is the third object of the invention to realize an object tracking apparatus for tracking the movement of an object by using an information memory area in an image pickup device or a memory device for fetching information for blurring correction.

The fourth object of the invention is to realize an object tracking function by using a device and a circuit which are not used when the blurring correction is not executed, thereby reducing the circuit scale and costs.

To accomplish the above objects, according to a preferred embodiment of the invention, there is disclosed a photographing apparatus having a blurring correcting apparatus to correct a camera blurring by decentering a photographing optical axis by optical axis decentering means in accordance with the camera blurring, wherein the photographing apparatus comprises object coordinate detecting means for detecting coordinates of an object; and control means for driving the optical axis decentering means in accordance with the detected object coordinates so that the object is located at a predetermined position on a picture plane.

According to another preferred embodiment of the invention, there is provided a photographing apparatus having a blurring correcting apparatus in which image information is converted into an electric signal and stored into an image memory and a data reading-out range of the image memory is moved in accordance with a camera blurring, thereby correcting the camera blurring, wherein the photographing apparatus comprises object coordinate detecting means for detecting coordinates of an object; and control means for moving the data reading-out range of the image memory in accordance with the detected object coordinates.

The above and other objects and features of the present invention will become apparent from the following detailed description and the appended claims with reference to the accompanying drawings.

BRIEF DESCRIPTION OF THE DRAWINGS

FIG. 8 is a schematic constructional block diagram of the third embodiment of the invention;

DETAILED DESCRIPTION OF THE PREFERRED EMBODIMENTS

Figure 1:
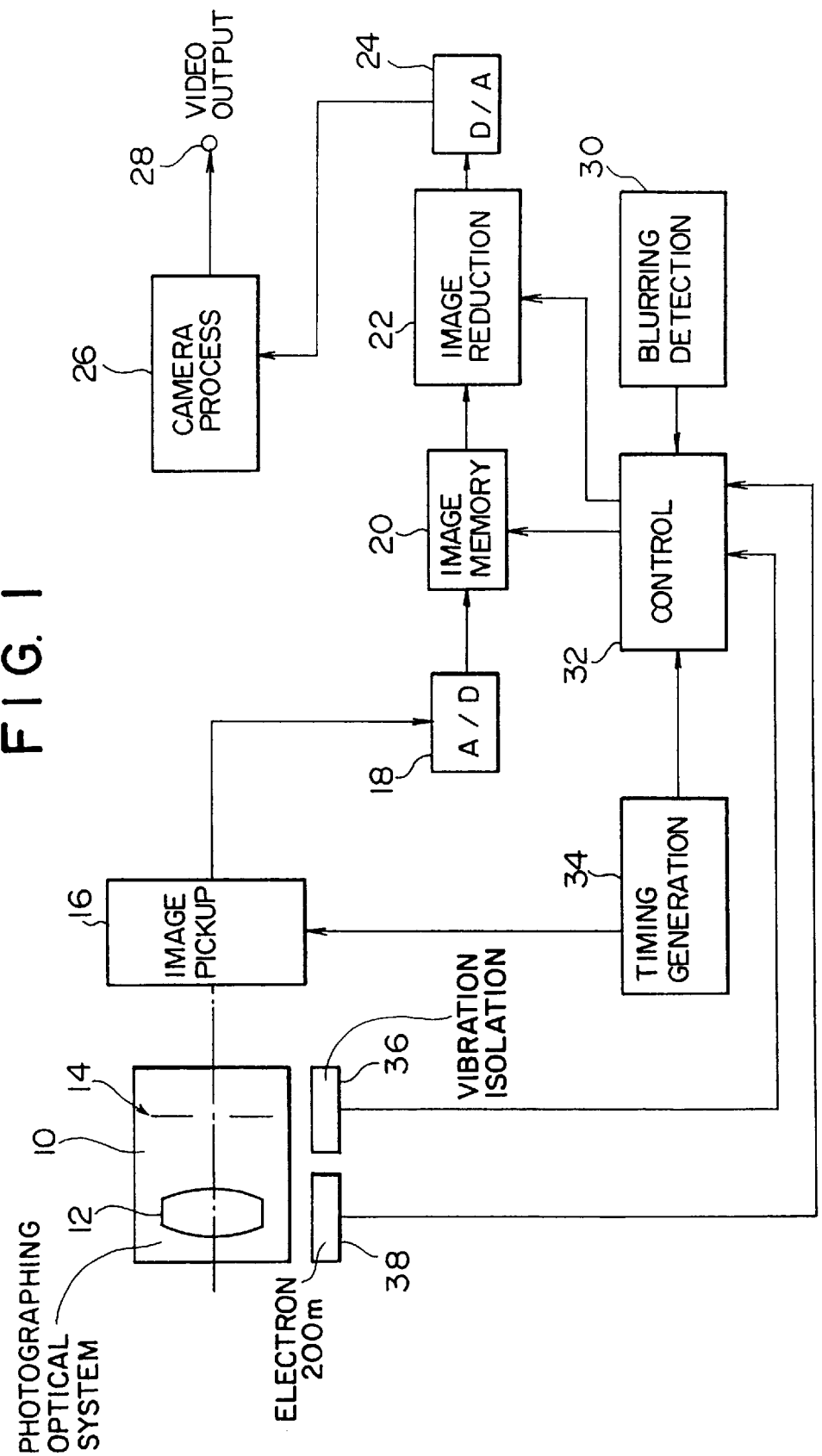
FIG. 1 is a schematic constructional block diagram of the first embodiment of the prevent invention.

FIG. 1 shows a schematic constructional block diagram of an embodiment of the invention. Reference numeral 10 denotes a photographing optical system having a photographing lens 12 and a diaphragm 14. The photographing lens 12 includes a focusing lens. The photographing lens 12 can have an optical variable magnifying function or it is not always necessary to have such a function. Reference numeral 16 denotes an image pickup such as a CCD or the like to convert an optical image into an electric signal. A photoelectric converting surface, namely, an image pickup surface has an image pickup area wider than the ordinary image output area for the purpose of the blurring correction. Reference numeral 18 denotes an A/D converter to convert an analog output of the image pickup 16 into a digital signal; 20 an image memory to store the output image data of the A/D converter 18; 22 an image reducing circuit to reduce the image of the image data which is read out from the image memory 20 at a designated reduction ratio; 24 a D/A converter to convert the digital output of the image reducing circuit 22 to the analog signal; 26 a camera processing circuit for executing well-known camera signal processes such as gamma correction and the like to an output signal of the D/A converter 24 and for generating a video signal of a standard format; and 28 an output terminal of the video signal of the photographed image.

Reference numeral 30 denotes a blurring detection circuit to detect a camera blurring by an angular velocity sensor or an angular acceleration sensor; 32 a control circuit which is constructed by a microcomputer and controls the whole apparatus; 34 a timing generation circuit to supply predetermined timing signals to the image pickup 16 and control circuit 32; 36 a vibration isolation switch to designate whether the vibration isolation (blurring correction) is performed or not; and 38 an electron zoom switch to instruct a zoom ratio of the electron zoom. The electron zoom switch 38 is constructed by, for example, a variable resistance type switch. In the embodiment, the electron zoom can be selected only when the blurring correction is not performed.

Figure 2:
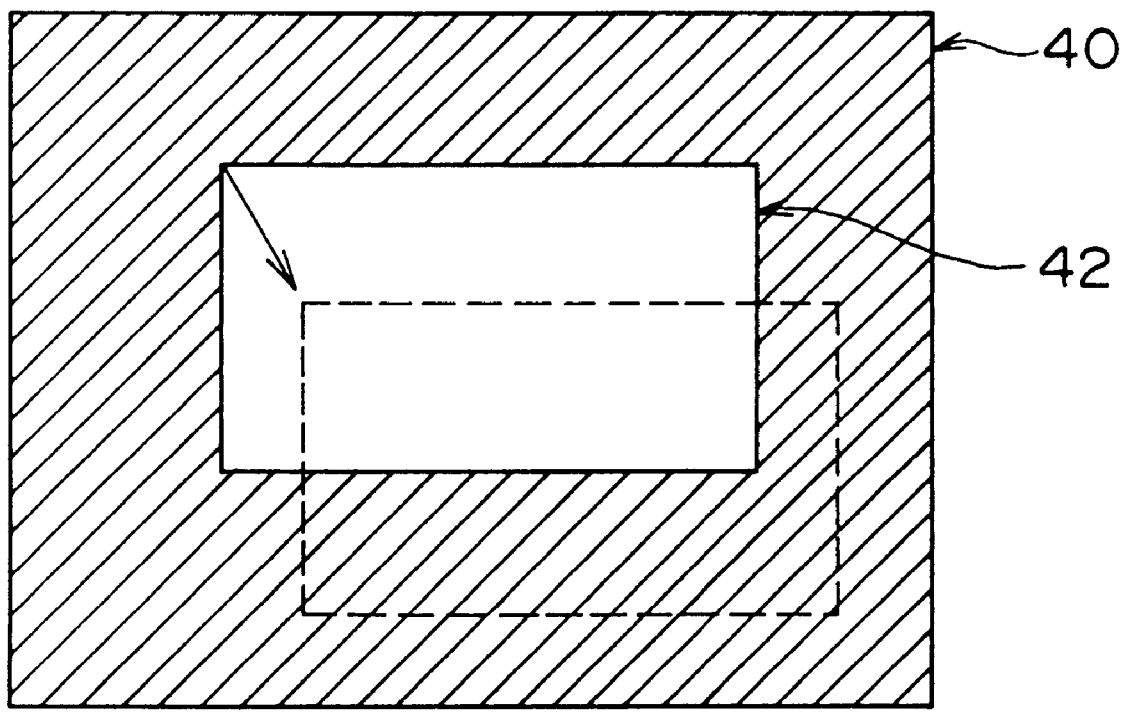
FIG. 2 is a diagram for explaining the concept of the blurring correction by image signal processes.

In the blurring correction by the image signal processes, as a concept, as shown in FIG. 2, an output image area 42 is properly moved in a photographing image information area 40 wider than the ordinary area in such a direction as to eliminate the camera blurring, the image information in the output image area 42 after completion of the movement of the area 42 is read out, and an output video signal is formed. For instance, the output image area 42 surrounded by a solid line is moved to an area surrounded by a broken line in accordance with the camera blurring amounts and direction. A hatched portion on the outside of the output area 42 corresponds to the surplus image information for preparation of the blurring correction (vibration isolation) and is never used when the blurring correction (vibration isolation) is not performed. In the embodiment, the use of the image information of the hatched portion is proposed.

When the vibration isolation switch 36 is ON, the control circuit 32 operates in the vibration isolation mode. The blurring detection circuit 30 detects the blurring of the camera main body and generates a signal indicative of the camera blurring amounts in the horizontal and vertical directions to the control circuit 32. The analog output of the image pickup 16 is converted into the digital signal by the A/D converter 18 and stored into the image memory 20. In accordance with the camera blurring amounts and direction which are detected by the blurring detection circuit 30, the control circuit 32 controls a memory area (corresponding to the output image area 42) to read out the image data in the image memory 20. The control circuit 32 allows the signal from the image memory to pass through the image reducing circuit 22. The image data which has been read out from the selected memory area passes through the image reducing circuit 22 and is supplied to the D/A converter 24 and is converted into the analog signal. The analog signal is supplied to the camera processing circuit 26. The camera processing circuit 26 executes well-known signal processes and supplies as a video signal to the output terminal 28.

Figure 3:
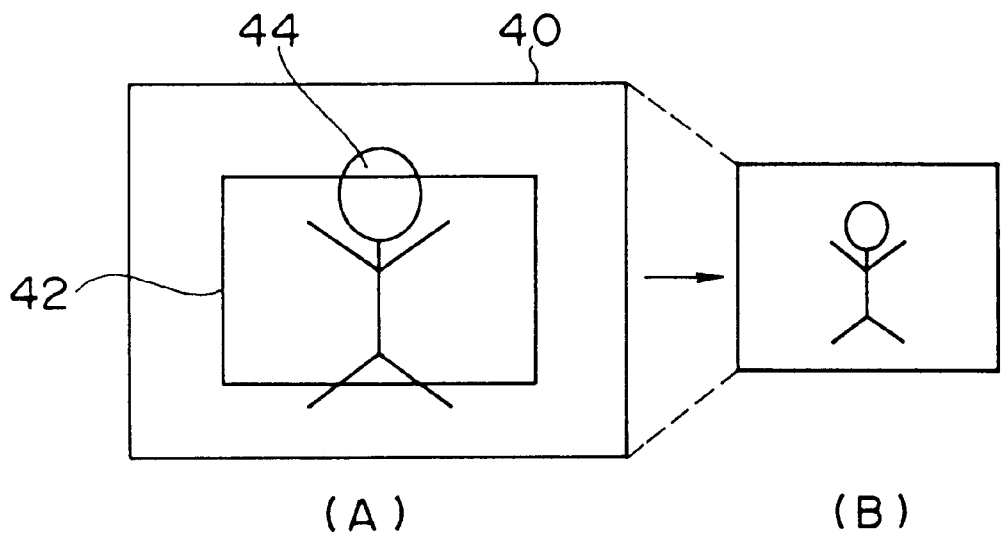
FIG. 3 is an explanatory diagram of an electron zoom according to the embodiment.

When the vibration isolation switch 36 is OFF, the control circuit 32 sets the reduction ratio of the image reducing circuit 22 in accordance with the zoom ratio which is designated by the electron zoom switch 38. In the above operating mode, from the image memory 20, there is read out the image data which is stored into the memory area of such an extent that in the case where the image is reduced by the image reducing circuit 22, the image signal of the picture plane of the size corresponding to the output image area is derived. For instance, in the case where an object 44 occupies a position as shown in (A) in FIG. 3 for the photographing image information area 40 and the output image area 42, when the area 40 is reduced to the area 42, the output image becomes the reduced image as shown in (B) in FIG. 3.

Figure 4:
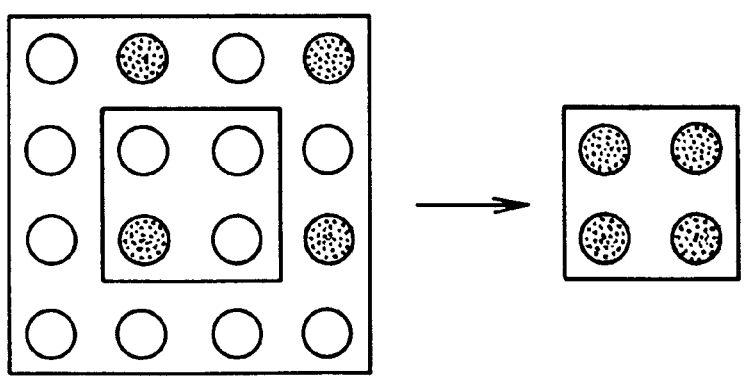
FIG. 4 is an explanatory diagram of the ¼ reduction according to the embodiment.

An image reducing method in the image reducing circuit 22 is not particularly limited. However, for instance, in the case of ¼ zoom such as to reduce into ¼, the data consisting of (4×4) pixels is thinned out every other pixel in both of the horizontal and vertical directions and generated as (2×2) pixels. For example, in FIG. 4, the pixels of black dots among the (4×4) pixels are selected, so that (2×2) pixels are generated.

The output of the image reducing circuit 22 is converted into the analog signal by the D/A converter 24. The camera processing circuit 26 executes the above signal processes and supplies the video signal of the standard format to the output terminal 28.

Although the embodiment has been described with respect to an example in which the image data is thinned out when the image reducing circuit 22 reduces the image, the picture quality can be also improved by compressing the band without thinning out the image data. The latter method is advantageous, for example, in the case of obtaining a hard copy. Although the embodiment has been described on the assumption that the reduction ratio of the image reducing circuit 22 can be arbitrarily set, a single fixed reduction ratio can be also used or desired one of a plurality of fixed reduction ratios can be also selected.

As will be easily understood from the above description, according to the invention, the function to electronically reduce the image by effectively using the image information for blurring correction can be added. Since the image information only for the blurring correction is used, the novel function can be cheaply built in the apparatus.

According to the first embodiment of the invention, the image information photographed by using the image pickup means which can pick up the image information in a range wider than the ordinary screen size is stored into the image memory. When the blurring correction is executed, the reading-out range of a predetermined size is shifted in the image memory in such a direction as to eliminate the camera blurring and the blurring is corrected. When the blurring correction is not executed, the image information stored in the whole area in the image memory is read out and, after that, it is reduced so as to match the screen size, thereby enabling the image information in the area for executing the blurring correction to be also generated even when the blurring correction is performed.

According to the following second embodiment, a tracking operation of an object is executed by using the area for blurring correction mentioned above.

Figure 5:
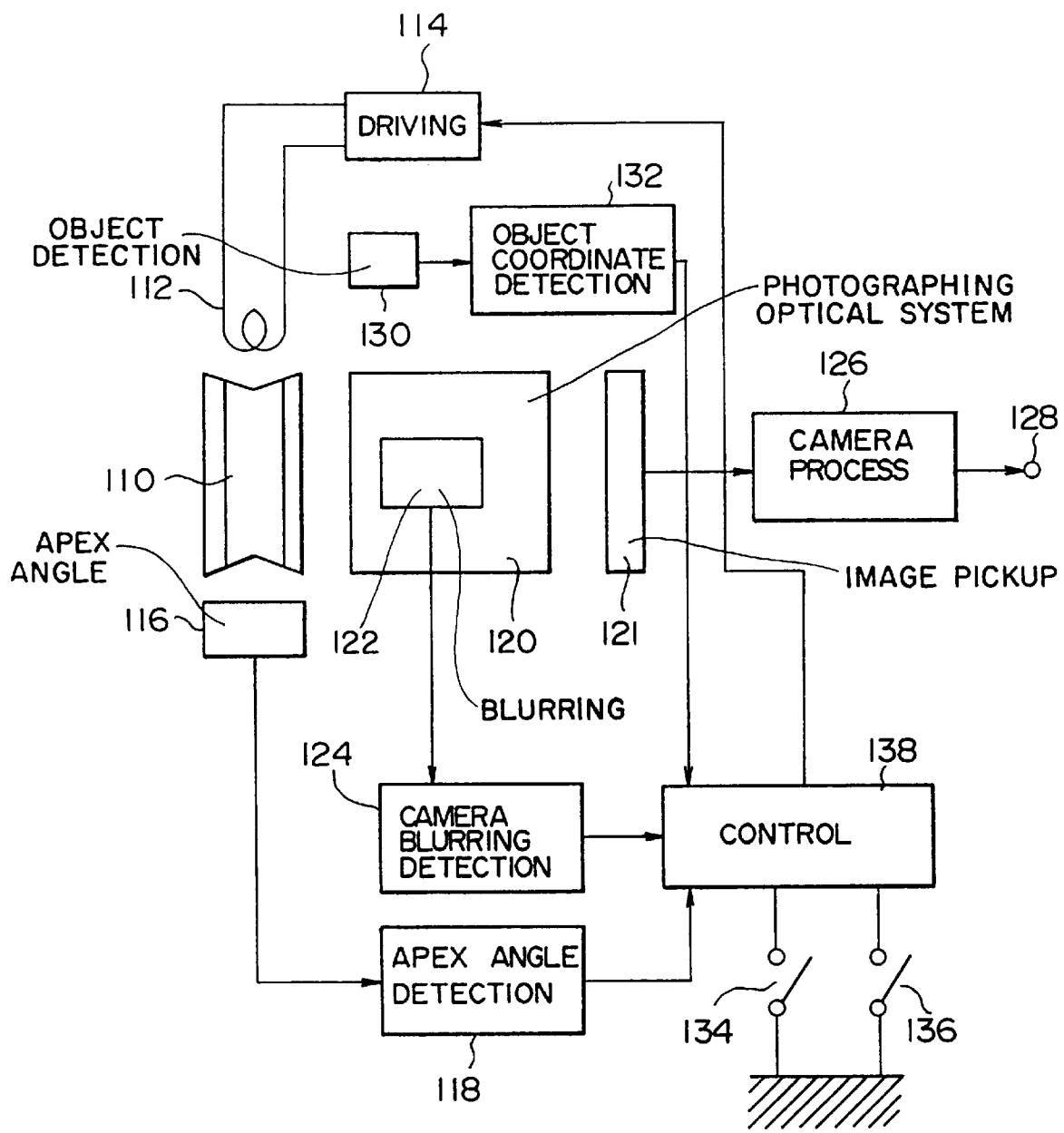
FIG. 5 is a schematic constructional block diagram of the second embodiment of the invention.

FIG. 5 shows a schematic constructional block diagram of the second embodiment in the case where the invention is applied to a photographing apparatus using a variable apex angle prism as a blurring correcting apparatus. Reference numeral 110 denotes a variable apex angle prism (VAP), 112 an actuator (for instance, coil to generate an electromagnetic driving force) to change an apex angle of the prism 110; 114 a driving circuit of the actuator 112; 116 an apex angle sensor to measure the apex angle of the prism 110; and 118 an apex angle detection circuit to generate a signal indicative of the apex angle of the prism 110 from an output of the apex angle sensor 116.

Reference numeral 120 denotes a photographing optical system; 121 an image pickup; and 122 a blurring sensor which is constructed by an angular velocity sensor or an angular acceleration sensor and detects camera blurrings in both of the horizontal and vertical directions. The blurring sensor 122 is fixed to a lens barrel of the photographing optical system 120. Reference numeral 124 denotes a camera blurring detection circuit to detect camera blurring amounts from an output of the blurring sensor 122; 126 a camera processing circuit for executing well-known camera signal processes such as a gamma correction and the like to the photoelectric conversion signal from the image pickup 121 and for generating the video signal of the standard format; and 128 an output terminal of the video signal of the photographed image.

Reference numeral 130 denotes an object detection sensor to detect an object which is seen by a photographer, namely, an object to be tracked. Reference numeral 132 denotes an object coordinate detection circuit to calculate the coordinate position of the object from an output of the sensor 130. The coordinate position of the object which is seen by the photographer can be known by the sensor 130 and the object coordinate detection circuit 132. Such an apparatus is disclosed in, for example, Japanese Patent Application Laid-Open No. 1-241511 or the like. A cornea reflecting method or an EOG method is scientifically known as a method of knowing the direction of the line of sight from the movement of the eyeballs.

Reference numeral 134 denotes a vibration isolation switch to set the vibration isolation mode; 136 a tracking switch to set the tracking mode; and 138 a control circuit to control the whole apparatus. The control circuit 138 operates in the vibration isolation mode when the vibration isolation switch 134 is ON. The control circuit 138 operates in the tracking mode when the vibration isolation switch 134 is OFF and the tracking switch 136 is ON.

The operation in the vibration isolation mode will be first briefly described. The camera blurring detection circuit 124 supplies a signal indicative of camera blurring amounts in both of the horizontal and vertical directions to the control circuit 138 from the output of the camera blurring sensor 122. The apex angle detection circuit 118 supplies a signal indicative of the present apex angle of the variable apex angle prism 110 to the control circuit 138 from the output of the apex angle sensor 116. The control circuit 138 calculates a difference between the detection signals of the detection circuits 118 and 124 and supplies as a blurring correction signal to the actuator driving circuit 114. The driving circuit 114 changes the apex angle of the prism 110 by the actuator 112. By the above feedback control, the prism 110 decenters the photographing optical axis by only an amount corresponding to the camera blurring, thereby correcting the camera blurring. Consequently, the image signal without a blurring is generated from the image pickup 121 and is processed by the camera processing circuit 126 and is generated from the output terminal 128.

Figure 6:
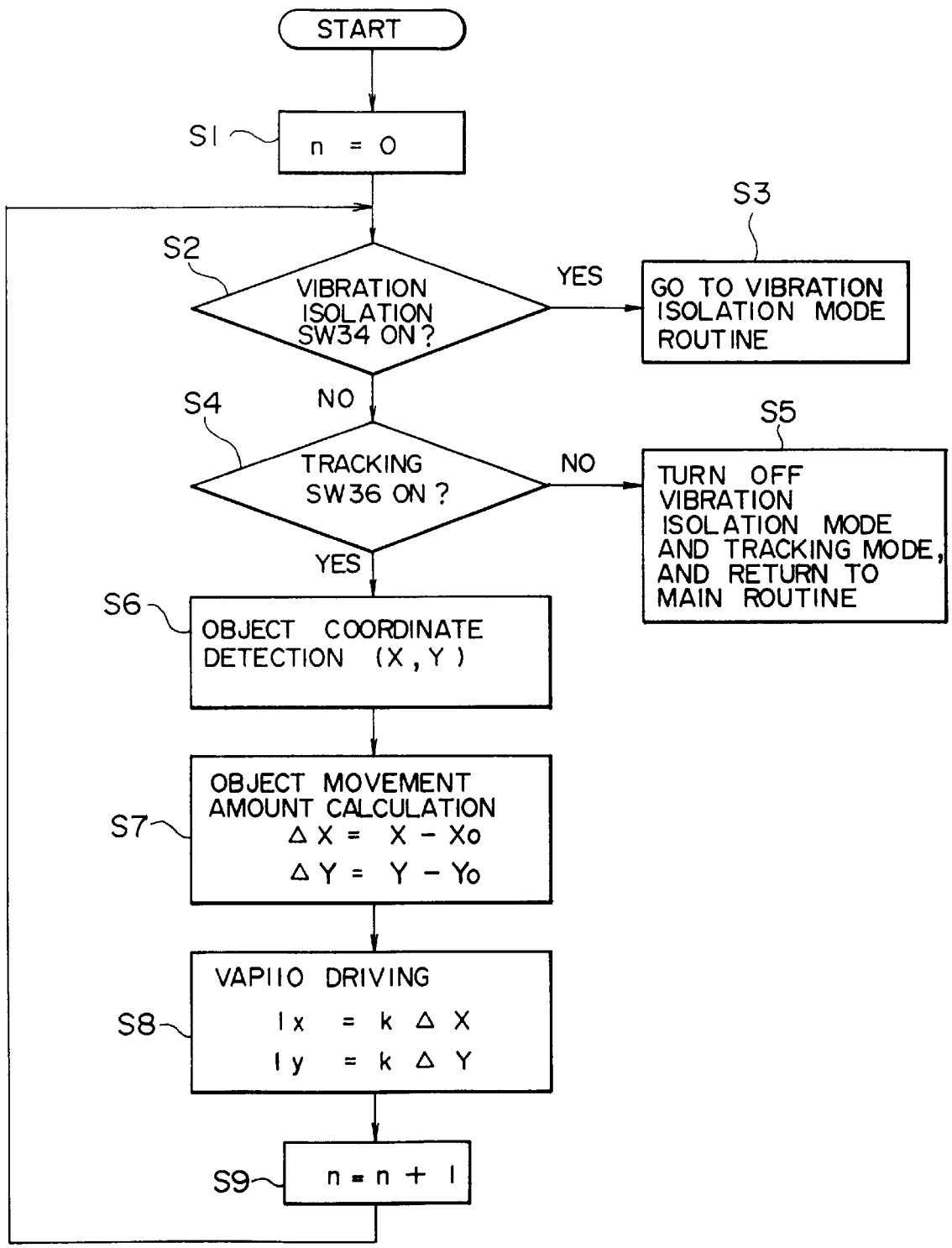
FIG. 6 is an operation flowchart in a tracking mode in FIG. 5.
Figure 7A:
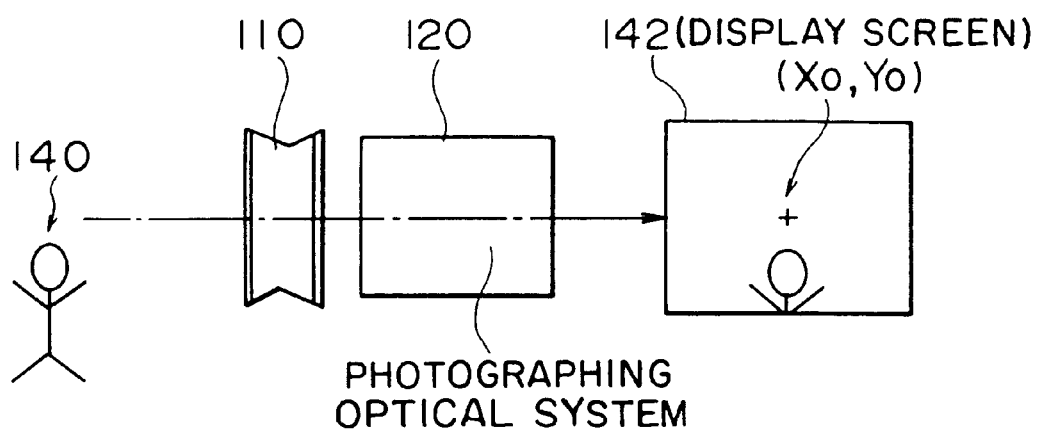
FIGS. 7A and 7B are diagrams for explaining effects in the tracking mode in FIG. 5.
Figure 7B:
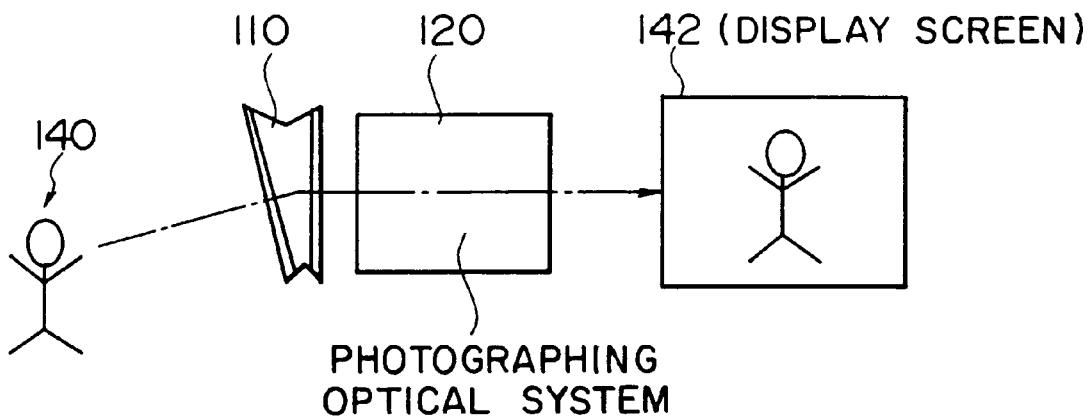

FIG. 6 shows an operation flowchart mainly in the tracking mode according to the embodiment shown in FIG. 5. FIG. 7A is an explanatory diagram when the tracking mode is not inoperative (OFF). FIG. 7B is an explanatory diagram when the tracking mode is operative (ON). In FIGS. 7A and 7B, reference numeral 140 denotes an object and 142 indicates a display screen of a monitor apparatus to display a video image of the output video signal of the camera processing circuit 126. The monitor apparatus is connected to the output terminal 128. The center coordinates of the monitor screen 142 are assume as $(X_0, Y_0)$.

FIG. 6 will now be described. First, a loop variable n is initialized (step S1). The states of the vibration isolation switch 134 and tracking switch 136 are checked (steps S2 and S4). When the vibration isolation switch 134 is ON, the apparatus operates in the vibration isolation mode mentioned above (S3). When both of the switches 134 and 136 are OFF (S2, S4), both of the vibration isolation mode and the tracking mode are turned off and the processing routine advances to a main routine (not shown) (S5). When the switch 134 is OFF and the switch 136 is ON (S4), the apparatus operates in the following tracking mode. That is, the object coordinates (X, Y) which are detected by the object sensor 130 and object position detection circuit 132 are read out (S6). A distance $(\Delta X, \Delta Y)$ from the center coordinates $(X_0, Y_0)$ is calculated (S7). A constant k is multiplied to the distance $(\Delta X, \Delta Y)$, thereby obtaining driving currents $I_x$ and $I_y$ of the actuator 112 (S8). In response to a control signal from the control circuit 138, the driving circuit 114 drives the actuator 112 by the driving currents $I_x$ and $I_y$. The loop variable n is increased (S9) and the processing routine is returned to Step S2.

By driving the variable apex angle prism 110 in the tracking mode, when the tracking mode is made inoperative, for instance, as shown in FIG. 7A, the image of the object 140 which is away from the center of the monitor screen 142 is obtained. When the tracking mode is made operative, the object image is located at the center of the monitor screen 142 as shown in FIG. 7B. When the blurring correction is not performed, a new function can be added by using the variable apex angle prism 110 which is in the inoperative state.

Figure 10:
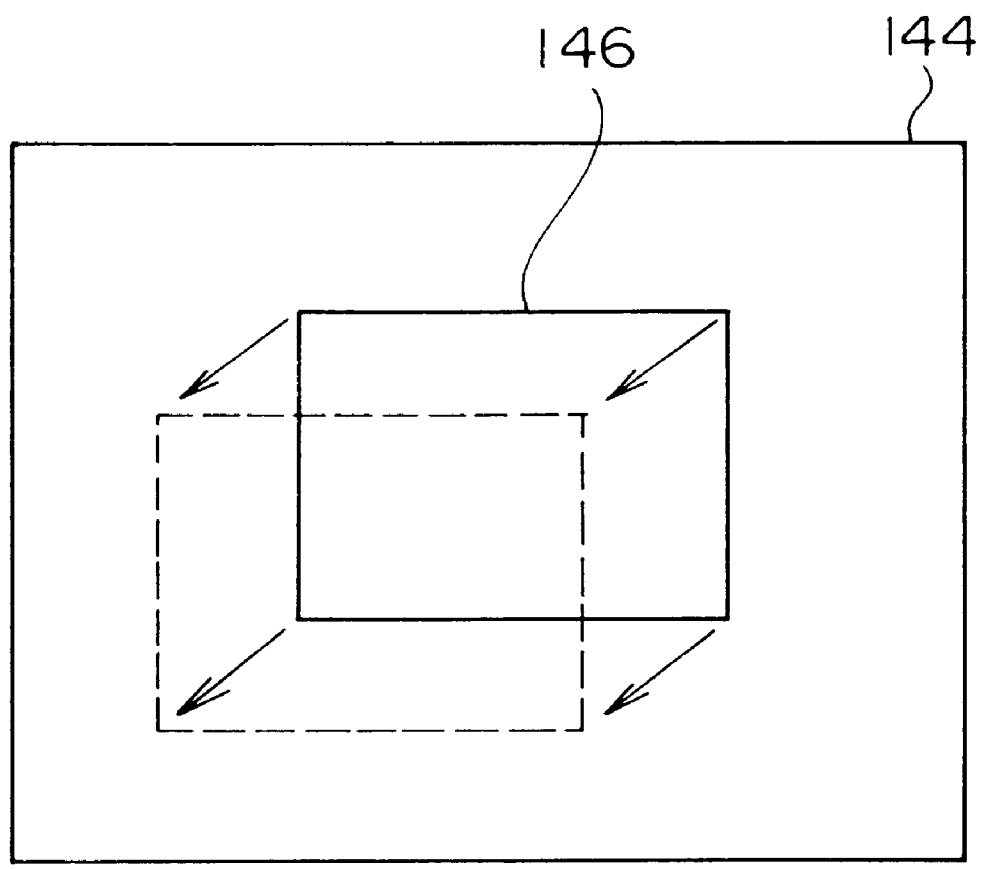
FIG. 10 is a principle diagram of the vibration isolation in FIG. 8.

An embodiment in which the invention is applied to a photographing apparatus for performing the blurring correction by image signal processes will now be described. In the blurring correction by the image signal processes, as a concept, as shown in FIG. 10, an output image area 146 is properly moved in a photographing image information area 144 wider than the ordinary area in such a direction as to eliminate the camera blurring and the image information in the output image area 140 is read out, thereby forming an output video signal. For instance, the output image area 146 surrounded by a solid line is moved to an area surrounded by a broken line in accordance with the camera blurring amounts and direction.

FIG. 8 shows a constructional block diagram of such an embodiment. In FIG. 8, the same component elements as those in FIG. 5 are designated by the same reference numerals. Reference numeral 150 denotes an image pickup having horizontal and vertical pixels of the number which is larger than the ordinary number of pixels as shown as a photographing image information area 144 in FIG. 10; 152 an A/D converter to convert an analog output of the image pickup 150 into a digital signal; 154 an image memory to store the output image data of the A/D converter 152; 156 a D/A converter to convert the digital image data which is read out from the image memory 154 to the analog signal; 158 a camera processing circuit similar to the camera processing circuit 126; 160 a video signal output terminal of the photographed image; and 162 a control circuit to control the whole apparatus.

The output of the image pickup 150 is converted into the digital signal by the A/D converter 152 and stored into the image memory 154. In the blurring correction, namely, in the vibration isolation, the control circuit 162 controls the memory area 146 to read out the image data in the image memory 154 in accordance with the camera blurring amounts and direction which are detected by the camera blurring detection circuit 124. The image data which has been read out from the area 146 selected in accordance with the camera blurring amounts and direction is converted into the analog data by the D/A converter 156. The camera processing circuit 158 executes the well-known signal processes and supplies as a video signal to the output terminal 160.

Figure 9:
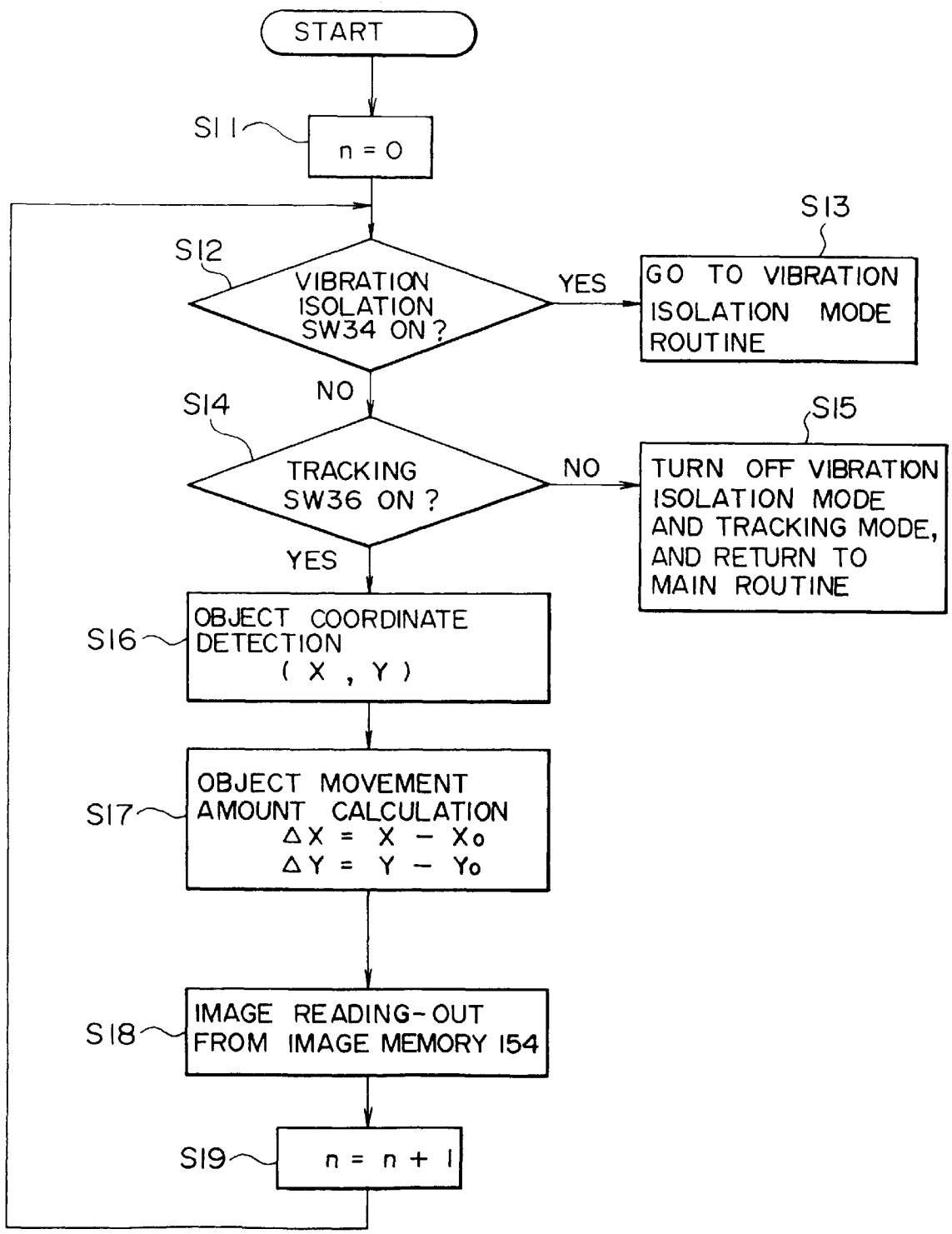
FIG. 9 is an operation flowchart in the tracking mode in FIG. 8.

FIG. 9 shows an operation flowchart in mainly the tracking mode according to the embodiment shown in FIG. 8. First, the loop variable n is initialized (step S11). The states of the vibration isolation switch 134 and tracking switch 136 are checked (S12, S14). When the switch 134 is ON, the apparatus operates in the foregoing vibration isolation mode (S13). When both of the switches 134 and 136 are OFF (S12, S14), both of the vibration isolation mode and the tracking mode are turned off and the processing routine advances to a main routine (not shown) (S15). When the switch 134 is OFF and the switch 136 is ON (S14), the apparatus operates in the following tracking mode. That is, the object coordinates (X, Y) which are detected by the object sensor 130 and object position detection circuit 132 are read out (S16) and the distance $(\Delta X, \Delta Y)$ from the center coordinates $(X_0, Y_0)$ is calculated (S17).

In the image memory 154, the control circuit 162 moves the reading-out range in the horizontal and vertical directions by only the amount corresponding to the distance $(\Delta X, \Delta Y)$ and reads out the image data for generation (S18). That is, in a manner similar to the case of the blurring correction, the output image area 146 is moved in the image information area 144 shown in FIG. 10 by only the amount corresponding to the distance $(\Delta X, \Delta Y)$. The image data in the moved area 146 is read out and supplied to the D/A converter 156. The analog image signal converted by the D/A converter 156 is processed by the camera processing circuit 158 and generates as a video signal from the output terminal 160.

The loop variable n is increased by "1" (S19) and the processing routine is returned to step S12.

As will be easily understood from the above description, according to the invention, the circuit and optical elements which are used in the blurring correction are used when the blurring correction is not performed, and the object tracking function can be added. Since the elements and circuit which are not used are utilized, a new function can be cheaply built in the apparatus.

What is claimed is:
1. A photographing apparatus comprising:
(A) optical axis decentering means for decentering an optical axis direction;
(B) blurring detecting means for detecting a blurring of the apparatus;
(C) detecting means for detecting an object image movement irrespectively of the blurring of the apparatus in a picked-up image; and
(D) control means for having a blurring correcting mode for controlling drive of said optical axis decentering means according to an output of said blurring detecting means to correct the blurring, and an object tracking mode for controlling drive of the optical axis decentering means according to an output of said detecting means to track the object image.

2. An apparatus according to claim 1, wherein said optical axis decentering means is a variable apex angle prism.

3. An apparatus according to claim 1, wherein said blurring detecting means is constructed by an angular velocity sensor or an angular acceleration sensor.

4. An apparatus according to claim 1, wherein said detecting means is constructed by a sight line detecting means for detecting a line sight of a photographer.

5. An apparatus according to claim 1, further having selecting means for selectively making said blurring correcting mode and said object tracking mode operative.

6. An image pickup apparatus, comprising:
   (a) first detection means for detecting movement of said apparatus;
   (b) second detection means for detecting an object image moving irrespectively of the movement of said apparatus; and
   (c) optical movement correction means having a first movement correction mode for optically correcting the movement of said apparatus detected by said first detection means and a second movement correction mode for optically correcting the movement of said object image detected by said second detection means.

7. An apparatus according to claim 6, wherein said optical movement correction means is a variable apex angle prism.

8. An apparatus according to claim 6, wherein said first detection means includes an angular velocity sensor or an angular acceleration sensor.

9. An apparatus according to claim 6, wherein said second detection means includes sight line detection means for detecting a viewpoint of a photographer in a screen.

10. An apparatus according to claim 6, further comprising:
    switching means for selectively switching between said first movement correction mode and said second movement correction mode.

11. An image pickup apparatus, comprising:
    (a) first detection means for detecting movement of said apparatus;
    (b) second detection means for detecting the movement of an object image in a screen, which is caused by moving of the object itself;
    (c) optical movement correction means having a first movement correction mode for optically correcting the movement of said apparatus and a second movement correction mode for optically correcting the movement of said object image; and
    (d) control means for controlling turning on and off of said first movement correction mode and said second movement correction mode and for preferentially controlling the turning on and off of said second movement correction mode if both said first movement correction mode and said second movement correction mode are turned on simultaneously.

12. An apparatus according to claim 11, wherein said optical movement correction means is a variable apex angle prism.

13. An apparatus according to claim 11, wherein said first detection means includes an angular velocity sensor or an angular acceleration sensor.

14. An apparatus according to claim 11, wherein said second detection means includes sight line detection means for detecting a viewpoint of a photographer in a screen.

15. An image pickup apparatus, comprising:
    a) detecting means for detecting a movement;
    b) discriminating means for discriminating whether the detected movement is caused by a movement of an object or by a movement of said apparatus;
    c) movement correction means for correcting a movement of an image; and
    d) control means for controlling said movement correction means to correct a movement of an image according to an output of said discriminating means and an output of said detecting means.

16. An apparatus according to claim 15, wherein said movement correcting means optically corrects the movement of the image.

17. An apparatus according to claim 16, wherein said movement correcting means is a variable apex angle prism.

18. An apparatus according to claim 15, wherein said detecting means includes an angular velocity sensor or an angular acceleration sensor.

19. An apparatus according to claim 18, wherein said detecting means includes detecting circuit means for detecting the movement of the image from an image signal.

20. An apparatus according to claim 19, wherein said discriminating means discriminates whether the detected movement is caused by a movement of an object or by a movement of said apparatus on the basis of an output of said sensor and the output of said detecting circuit.

21. An apparatus according to claim 20, wherein said control means sets an object tracing mode in the case that said discriminating means discriminates the movement of the image is caused by the movement of the object and sets a shake correcting mode in the case that said discriminating means discriminates the movement of the image is caused by the movement of said apparatus.

22. An apparatus according to claim 21, wherein said control means controls said movement correcting means to correct the movement of the image according to the output of the sensor in the shake correcting mode and controls said movement correcting means to correct the movement of the image according to the output of the detecting circuit in the object tracing means.

23. An image movement correcting method, comprising:
    a) a step of detecting a movement;
    b) a step of discriminating which the movement is caused by a movement of an object or by a movement of said apparatus;
    c) a step of correcting a movement of an image; and
    d) a step of controlling a process in said movement correction step to correct the movement of the image according to an output of said discriminating step and an output of said detecting step.

24. A method according to claim 23, wherein said movement correcting step optically corrects the movement of the image.

25. A method according to claim 24, wherein said movement correcting step uses a variable apex angle prism.

26. A method according to claim 23, wherein said detecting step uses an angular velocity sensor or an angular acceleration sensor.

27. A method according to claim 26, wherein said detecting step uses a detecting circuit for detecting the movement of the image from an image signal.

28. A method according to claim 27, wherein said discriminating step discriminates which the movement of the image is caused by the movement of an object or by the movement of said apparatus on the basis of an output of said sensor and the output of said detecting step circuit.

\* \* \* \* \*